United States Patent [19]

Smith, Jr. et al.

[11] 4,361,433
[45] Nov. 30, 1982

[54] METHOD OF BENDING A GLASS SHEET

[75] Inventors: W. Novis Smith, Jr.; Nelson P. Bolton, both of Quakertown, Pa.

[73] Assignee: Advanced Glass Systems Corp., Trumbauersville, Pa.

[21] Appl. No.: 247,000

[22] Filed: Mar. 24, 1981

[51] Int. Cl.³ .................................................. C03B 23/03
[52] U.S. Cl. ..................................... 65/116; 65/104; 65/106
[58] Field of Search .......................... 65/104, 106, 116

[56] References Cited

U.S. PATENT DOCUMENTS

| | | | |
|---|---|---|---|
| 170,339 | 11/1875 | Brookfield. | |
| 1,959,215 | 3/1934 | Owen. | |
| 2,052,254 | 8/1936 | Shaver | 49/89 |
| 2,145,128 | 1/1939 | Phillips | 49/89 |
| 2,146,224 | 2/1939 | Phillips | 49/89 |
| 2,194,730 | 3/1940 | Wilson | 49/89 |
| 2,215,041 | 9/1940 | Hostetter | 49/84 |
| 2,235,969 | 3/1941 | White | 49/45 |
| 2,395,727 | 2/1946 | Devol | 49/67 |
| 2,850,844 | 9/1958 | White | 49/7 |
| 3,459,521 | 8/1969 | Nedelec | 65/104 X |
| 3,473,909 | 10/1969 | Bennett et al. | 65/106 |
| 3,795,570 | 3/1974 | Jansson et al. | 65/106 X |
| 4,233,049 | 11/1980 | Seymour | 65/106 |
| 4,233,050 | 11/1980 | Comperatore et al. | 65/107 |
| 4,289,520 | 9/1981 | Bolton | 65/104 |

FOREIGN PATENT DOCUMENTS

| | | | |
|---|---|---|---|
| 1215559 | 4/1960 | France | 65/106 |
| 1209041 | 10/1970 | United Kingdom | 264/339 |

Primary Examiner—Arthur D. Kellogg
Attorney, Agent, or Firm—Steele, Gould & Fried

[57] ABSTRACT

A method of handling a glass part to be treated and shaped in a hot liquid bath of a composition having a melting point greater than ambient temperature comprises the steps of: placing at least one glass part on at least one flexible porous member suspended by its edges; immersing the glass part, flexible member and a form in the hot bath; drawing the immersed glass part against the form by pulling the edges of the flexible porous member over the form; removing the form, glass part and flexible member from the bath as a unit, whereupon the glass and a portion of the bath composition hardens, the bath composition clinging to the glass and porous member; removing the form from the glass; and, removing the flexible porous member, and essentially all of the bath composition clinging to the glass. Protection for the glass and further ease of handling are provided where a second flexible porous member is placed between the glass and the form. Additional sheets of glass may be added, with interspersed flexible porous members, to produce matched sets of glass parts of accurate complimentary dimensions.

8 Claims, 4 Drawing Figures

METHOD OF BENDING A GLASS SHEET

BACKGROUND OF THE INVENTION

1. Field of the Invention

This invention relates to the field of glass treatment using hot liquid baths, and in particular to shaping, tempering and annealing glass in a bath of molten salt.

2. Description of the Prior Art

Heating and chemical tempering of glass parts using hot liquid baths is not new to the art of glass forming. Such baths, usually comprising molten salt or metal, are beneficial in that thermal inertia allows the mass of liquid to maintain a relatively constant temperature. In addition, simultaneous heating and chemical treatment can be accomplished in the bath, the larger cation of the salt bath being exchanged with the smaller cation in the glass surface (e.g., potassium for sodium or sodium for lithium). All that is necessary for heating purposes is that the bath composition have a melting point lower than the softening point of the glass, and not disassociate or boil at the temperatures necessary for forming.

Although the use of molten liquid apparatus for heating has been known to have the foregoing advantages, there are also certain problems. For example, the sudden temperature change encountered when a glass part is moved from the relatively cool ambient air into the relatively hot molten salt bath results in uneven expansion of the glass and can cause cracking. To combat such uneven heating, glass blanks are often preheated before immersion in the molten salt bath. A similar temperature difference problem is encountered upon removal. While the molten salt is liquid at the temperature of the bath, the salt becomes a solid at the lower ambient temperature. The salt or metal bath composition clings to the glass as it solidifies and must be removed. Where bending is accomplished in a molten salt or metal bath, the hardening bath composition tends to adhere to the bending apparatus as well, when removed from the vat of molten bath composition and cooled.

Bending and handling apparatus which must be repeatedly dipped into a molten salt bath is soon corroded. Materials which are not easily corroded, such as stainless steel, are expensive. Therefore, there is a need to minimize the handling apparatus associated with such dipping operations.

The usual mechanical devices for forming, shaping and supporting glass do not work adequately in a molten salt environment. In addition to the foregoing problems, the bath liquid is obviously more viscous than is the air, and operations must be conducted beneath the surface of the liquid which is at best translucent and at worst opaque. When these disadvantages are combined with the problems attendant with forming of very thin glass parts, it is not surprising that molten salt forming has not been widely accepted in the industry.

In furnace heating processes, the prior art has employed porous members where a gas, such as a blast of cooling air, was directed against softened glass while supported in its intended shape. The porous members were sometimes built rigidly as parts of molding members, whereby the cooling air could be passed directly through the mold face to the glass. Another example of such use of porous members has been where vacuum heads were used to pick up and transfer soft glass parts. In this situation, of course, the gas was withdrawn through the porous member, rather than supplied.

Flexible porous members have been used to support softened glass blanks. Inasmuch as a flexible support will sag into a parabolic arc under the weight of the glass, such supports have been employed to pre-form softened glass into roughly the shape to be molded, for example by blow forming through the flexible porous member.

Notwithstanding the foregoing uses of flexible coverings for glass, the usual prior art forming technique comprises use of forming members which contact the glass at point contact rather than spreading the contact pressure over a surface. Where a curved male/female mold is closed on a flat glass blank, contact and surface marring occurs at one point on the male member and two points on the female member. As the mold closes further, the glass sheet undergoes stretching forces between the male and female contact points as well as compressing forces between the female contact points. In other words, forces are exerted along the plane of the glass sheet, tending to stretch and ripple the soft glass. Stretching and rippling in the glass means variations in thickness, which variations are undesirable in glass to be laminated and in optical applications.

Flexible porous members such as mesh screens have not heretofore been entirely successful in glass treatment in hot liquid baths. Mesh screens, and in fact porous members in general, compound the problem of adherence of the solidifying liquid bath composition to dipped apparatus such as the mold, the glass and especially the screen. In the prior art, relatively low temperature baths have been thought necessary to reduce the adherence of the bath composition to the glass and/or mold. It will be appreciated that this approach attempted to prevent hardening of the bath composition until the formed part could be removed from the mold and the bath composition removed. Alternatively, non-wetting solutions have been attempted whereby the bath composition would hopefully not cling to the glass or mold.

The present invention employs the mesh screening not only as a support, as was successful in furnace-type environments, but as a forming member in a molten salt bath forming technique. A very fine mesh is used to support and protect the glass blank before, during and after forming. The mesh itself acts as one of two forming members, bending the softened glass over a form, and evenly distributing forming forces over the entire surface of the glass. The extreme temperature change between ambient and the temperature of the hot liquid is ameliorated by the presence of the fine mesh screen, through which the hot liquid can move only slowly. The fine mesh protects the glass surface from marring due to mechanical interaction with the form, and prevents surface checking due to sudden changes in temperature when the glass is inserted and/or removed from the molten salt bath.

Upon removal, the molten salt indeed adheres to the fine mesh screen. However, the mesh is sufficiently fine and is held sufficiently close to the glass that, upon the mesh being removed, the hardened molten salt is virtually all carried away.

SUMMARY OF THE INVENTION

It is a primary object of this invention to gain the benefits of use of a molten salt bath for glass forming without the attendant problems.

It is also an object of this invention to minimize the degradation of glass surfaces during bending and treatment due to mechanical contact, sudden temperature change and force along the plane of the glass.

It is another object of this invention to preserve the optical quality of a flat glass blank during forming to curved shape.

It is another object of this invention to provide a convenient, inexpensive and consumable means of handling glass parts in a molten salt treatment method for glass.

It is yet another object of this invention to improve the safety of glass forming operations due to the ability to cool a formed glass piece before human intervention is required.

These and other objects are accomplished by a method of handling a glass part to be treated and shaped in a hot liquid bath of a composition having a melting point greater than ambient temperature, comprising the steps of: placing at least one glass part on at least one flexible porous member suspended by its edges; immersing the glass part, flexible member and a form in the hot bath; drawing the immersed glass part against the form by pulling at least one edge of the flexible porous member over the form; removing the form, glass part and flexible member from the bath as a unit, whereupon the glass and a portion of the bath composition hardens, the bath composition clinging to the glass and porous member; removing the form from the glass; and, removing the flexible porous member and essentially all of the bath composition clinging to the glass. Protection for the glass and further ease of handling are provided where a second flexible porous member is placed between the glass and the form. Additional sheets of glass may be added, with interspersed flexible porous members, to produce matched sets of glass parts of accurate complimentary dimensions.

The mesh screen protects the glass from marring or uneven deformation during bending, due to protection from contact, cushioning of thermal shock and exertion of force which bends rather than molds the glass. The fine mesh impedes the free flow of bath fluid through the flexible porous member, whereby a layer of the bath composition protects and cushions the glass during forming. After treatment, excess bath composition drains away through the mesh. When the glass part and its supports have cooled, the formed glass and any clinging bath composition can be removed from the mold and from one another by peeling the flexible porous member from the glass part.

DESCRIPTION OF THE PREFERRED EMBODIMENTS

The present invention is primarily concerned with forming blanks of thin, flat glass to predetermined curved shapes useful for such applications as face plates, windshields and goggles. In such applications, the dimensions of the finished glass part must be carefully controlled for several reasons. Sheets of glass for such applications are usually laminated for strength and safety. Accordingly, the dimensions of curved portions must be repeatable to minimize problems in lamination as well as the stresses and possible delamination which may occur if dimensions vary to unacceptable levels. Not only must the curvature be carefully controlled, but variations in thickness must be minimized.

For optical applications, the thickness of the glass part must not vary across the surface of the part. Glass parts having changing thickness across their surfaces diffract incident light, and act as lenses. Accordingly, the glass must be evenly thick throughout. The surface of the glass part must be smooth and free of indentations and bumps for the same reason. Such variations in thickness will distort the image seen by a wearer or user of such a glass part. Unplanned distortions and lens effects of even minor proportion can result in user headaches, or can cause a user to misjudge a size or distance. In the art of personal protective faceplates and goggles, these distortions are especially unacceptable because the gear is worn in dangerous environments and for extended periods of time.

In order to avoid introducing distortions during forming of glass parts for face plates, windshields, etc., the present invention contemplates forming glass parts to the desired dimensions using a flexible porous means to bend the glass around a curved form in a molten salt bath. Contact areas of conventional molding apparatus must move relative to the glass surface during molding, thereby exerting forces which would stretch and ripple the softened glass. In the present invention, a screen member is used to support the glass and to protect the surface from indentations, stretching, rippling or other variations in thickness which conventional molding apparatus might introduce. Use of the proper molten salt bath has the additional benefit of allowing chemical tempering to proceed concurrently with forming, due to ion exchange between the glass and salt.

Figure 4:
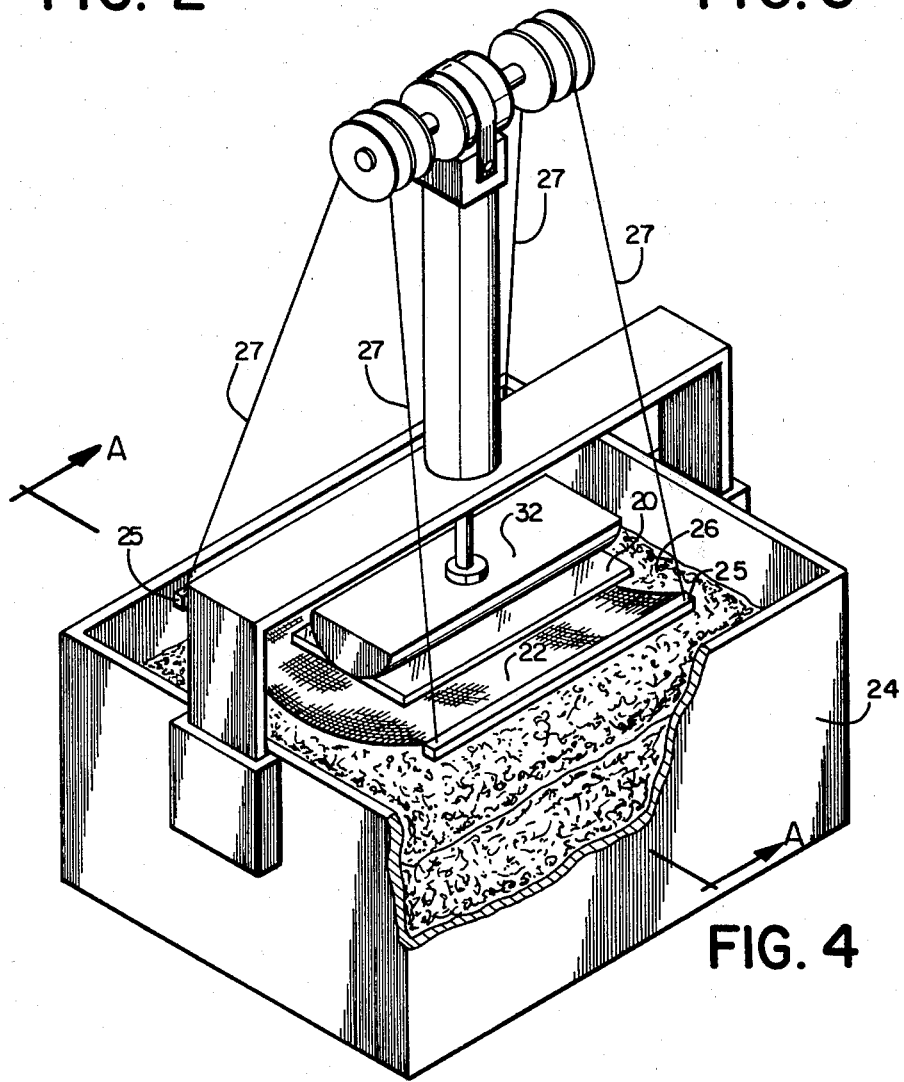
FIG. 4 is a cutaway perspective view of an apparatus for use with the present invention.

With reference to FIG. 4, flat glass blank 20 is to be formed into the bent shape of the lower surface of form 32, using flexible porous member 22. For precise temperature control and chemical tempering, the operation is to be performed while the glass part 20 is submerged in molten salt 26 within vat 24. Heating and control apparatus (not shown) maintain the temperature of molten salt 26 just slightly above the softening temperature of the glass.

Figure 1:
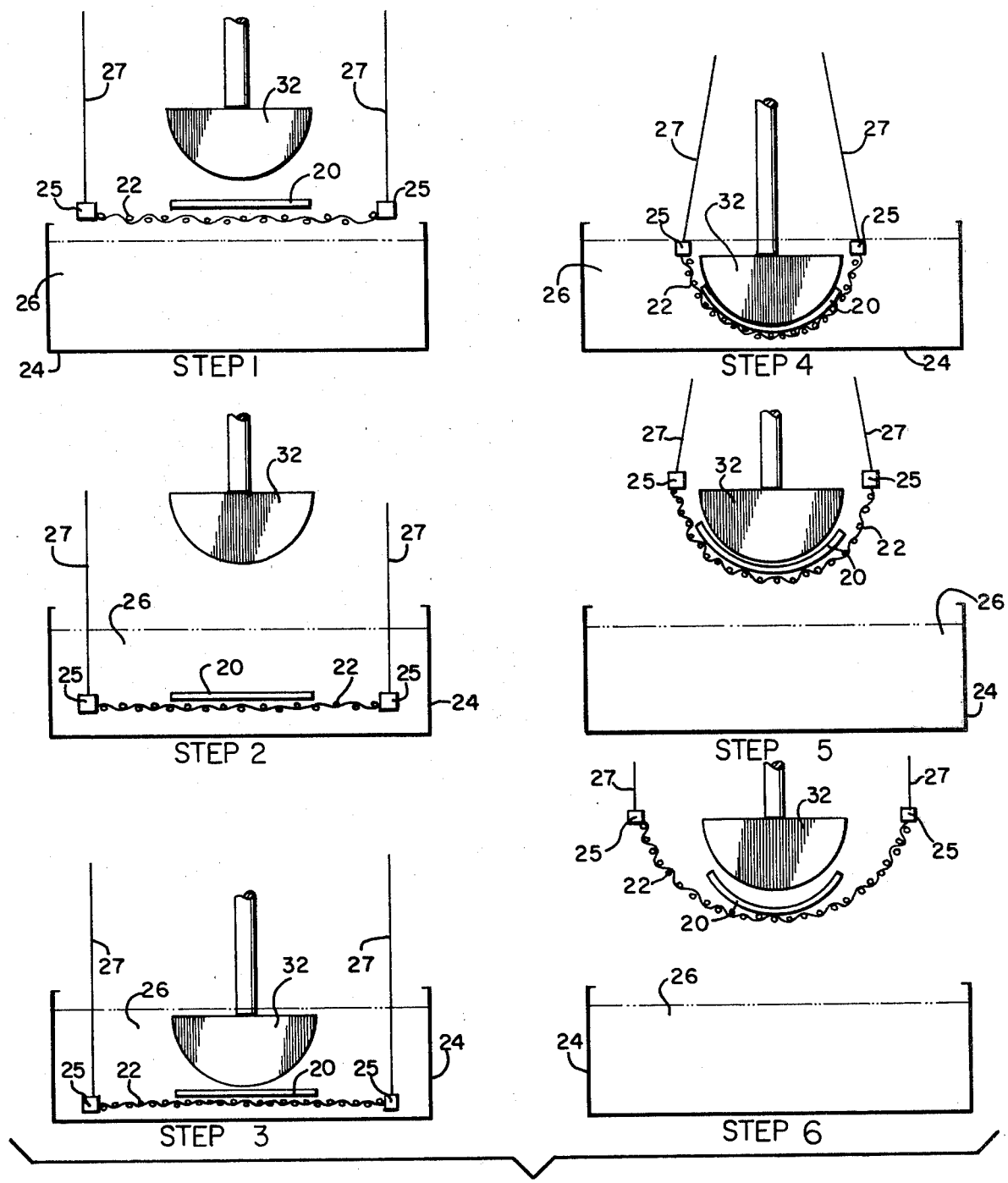
FIG. 1 is a schematic representation of the six basic steps of the method of this invention, each step a schematic section view taken along line A—A in FIG. 4.
Figure 2:
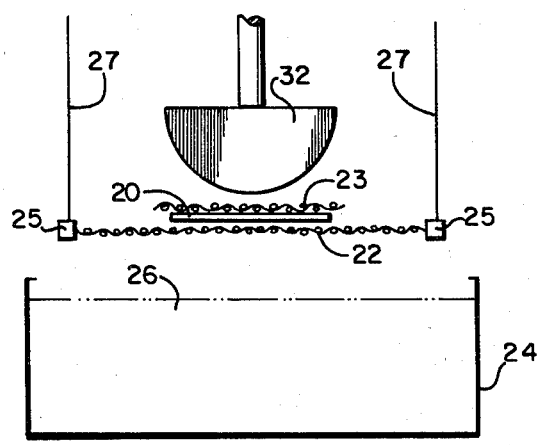
FIG. 2 is a schematic section view showing a preferred embodiment.

As shown in FIGS. 1 and 4, the basic apparatus required includes a flexible screen 22 which supports the glass blank 20 to be formed, a vat 24 holding molten salt 26, and a form 32 over which glass 20 will be bent. The screen 22 and the form 32 are adapted to be independently lowered into molten salt 26, for example by pneumatic or hydraulic means and/or motors. Of course, the operation may also be carried out by hand or by other means as desired.

Figure 3:
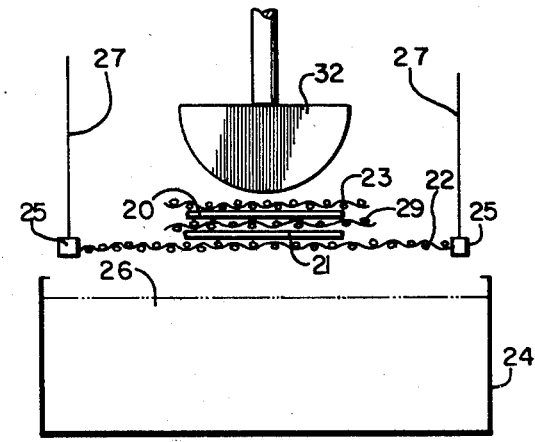
FIG. 3 is a schematic section view showing an alternate preferred embodiment.

A single layer of screen 22 is all that is strictly necessary to bend glass 20 over form 32. For best results it is presently preferred, however, that at least one additional layer of screen 23 be included between the form 32 and glass 20 for added protection of the glass. Screen 23 protects glass 20 from uneven deformation because the pressure of the form is spread over a larger area. The respective layers of screen 22, 23 enveloping glass 20 also protect the glass from an overly-sudden temperature change upon immersion, which might cause cracking.

Where two or more formed glass parts of the same dimensions are needed, for example to be laminated into a safety glass, two or more layers of glass, separated by a layer of screen, can be bent simultaneously. By this method, the producer is assured of glass parts which are of exactly complementary dimensions, and which are easily laminated. Variations between dimensions of glass parts due to slightly different conditions during successive bending operations are thus precluded. FIG. 3 illustrates forming of two layers of glass 20, 21 while the glass layers are supported by mesh 22, separated by mesh 29, and protected by mesh 23.

With reference to FIG. 1, the basic steps involved are as follows. Initially, the glass 20 is laid in flexible porous member 22 positioned above molten salt 26 in vat 24. (Step 1). The flexible porous member 22 is a very fine mesh material and is conveniently made of tightly woven or knitted ceramic fiber or stainless steel. The mesh may be of other materials, but must have a melting temperature high enough to survive the glass forming operation and should resist corrosion. With repeated use, mesh material of a softer metal or lower temperature material would be corroded and broken down by the action of molten salt 26, which is quite corrosive.

Once the glass part 20 is supported by mesh 22, and optionally covered by mesh 23, the glass and mesh layers are immersed in molten salt 26 within vat 24 (Step 2). A delay at this point allows the glass to be heated by salt 26 to just its softening temperature. Meanwhile, form 32 is mechanically lowered into the vat, against the glass, or preferably against the screen 23 covering glass 20 (Step 3). Next the supporting screen 22 is drawn up against the form by pulling at the edges of the screen, thereby bending the softened glass into the desired shape (Step 4).

As shown in the Figures for purposes of illustration, the supporting mesh sling 22 is mounted by its edges on rods 25 which are suspended on wires 27. It will be appreciated that many other methods of suspension are possible and may be advisable for certain applications. For example, where a hemispherical rather than cylindrical form is used, it may be advisable to omit rods 25. In commercial embodiment, it is presently preferred that sling 22 move along elevator type tracks during ascent and descent. It will also be appreciated that the present invention can be used to form irregular and nonsymmetrical bent shapes. For example if only a single edge of sling 22 is drawn over form 32, then only one side of the glass 20 will be bent.

The motion of form 32 is programmed such that the form descends slowly and gently against the glass 20 (or covering mesh 23) immersed in the molten salt 26. The sling 22 is then gently raised, for example by lifting rods 25 via wires 27, bringing the sling 22 into close juxtaposition with form 32. Since form 32 is dimensioned to exactly the desired shape, the glass is accurately bent to the desired curvature by this operation. Nevertheless, the glass is still soft and must be supported until cooled.

While mesh 22 holds the now softened, formed glass 20 securely against form 32, the entire unit comprising glass 20, form 32, and one or two layers of mesh 22, 23 is lifted out of the molten salt 26. (Step 5). The respective parts immediately begin to cool towards ambient temperature, the glass hardening and the salt solidifying. Once the glass has cooled below its strain point, the mesh 22 is released. (Step 6). The hardened salt clinging to the form, mesh and glass may cause the parts to cling to one another, however, the mesh layer 23 allows them to be readily separated. Moreover, the hardened salt clings preferentially to the porous screen layer or layers 22, 23, rather than to the smooth glass and form. Therefore, virtually all the salt is removed from the glass by merely removing the screen. Only superficial cleaning is necessary before the glass may be processed further.

During the actual forming step (i.e., drawing the supporting mesh 22 against form 32), no forces that would tend to stretch or compress the glass along its plane are developed. This attribute of the present process may be contrasted with the usual forming procedure using male and female mold members, each conforming to the desired shape. In the usual process, the initially flat glass blank contacts the curved mold members at certain points of contact. These points of contact change relative to any given point on the glass as the mold members are closed against the glass and one another. Since contact between the mold and glass cannot be frictionless, a force is thereby exerted along the plane of the glass, stretching and rippling it during the molding operation.

In the process of this invention, the points of contact between the forming apparatus and the glass do not vary. Therefore the apparatus does not stretch or ripple the glass and the uniform thickness of the flat glass blank is maintained in the finished part. During forming the flexible mesh *is* pulled along its plane, but the screen is practically inextensible. Thus the component of force which would otherwise stretch the glass is completely opposed by the screen material. The soft glass experiences only a bending force normal to its plane. Variations in thickness are not introduced.

The benefits of the fine mesh layers 22, 23 are not limited to their usefulness in supporting the glass. The fine mesh 23 also presents a friction-absorbing protective surface upon contact with the form. Thin layers of molten salt 26 occur between the mesh layers 22, 23 and the glass 20. These layers provide further protection for the glass. Since mesh 22, 23 is fine, salt 26 cannot move completely freely through the mesh. Accordingly, the salt which occurs between the mesh and glass provides a cushioning and lubricating effect protecting the glass surface while pressure is applied. Conversely, upon removal of the glass and mesh from the bath, the porous mesh allows most of the molten salt to drain away.

Meshes of anywhere from 50 to 450 strands per inch of 0.002 to 0.007 inch diameter strands are useable in this invention. Meshes of fewer strands per inch or greater diameter per strand, however, are more likely to leave are imprint on the glass, particularly with high temperature forming (i.e., soft glass). It should also be noted that more sparsely woven mesh, although cheaper, has less of a cushioning effect than tightly woven mesh. It has been discovered that a woven mesh of 300 threads of stainless steel wire per inch performs well in most applications to cushion the glass part as well as to support the formed part upon removal from the tank. Knitted meshed are also useful. Other alternatives that may be employed in other environments include a fabric of solid ceramic fibers of alumina woven 125 fibers to the inch. The alumina is especially suited to very high temperatures.

The present invention is advantageous for forming glass in a broad range of thicknesses. Very thin glass parts (e.g., 0.1 mm) may be shaped notwithstanding their rather flimsy nature because the mesh bears the brunt of rough handling, as well as because it spreads forming forces evenly over the entire surface. Moreover, relatively thick glass parts (e.g., 4.0 mm) can likewise be readily formed because the mesh stands up to rough handling.

It will be appreciated that the present invention is not limited to the precise arrangements and instrumentalities shown. Variations on the inventive concept will now be apparent to those of ordinary skill in the art. Accordingly, reference should be made to the appended claims, rather than the foregoing specification, as indicating the true scope of this invention.

What is claimed is:

1. A method of shaping a glass part comprising the steps of:
   (a) supporting the glass on a first flexible porous member;
   (b) immersing the first flexible porous member and supported glass in a hot liquid bath, the bath being of a composition that is a solid at room temperature and a liquid at the softening temperature of the glass, whereupon the glass part is softened by heating via contact with the hot liquid bath;
   (c) drawing the first flexible porous member over a form of a desired shape while immersed in the bath by pulling at least one edge of the member over the form, whereupon the glass deforms to the desired shape, the glass and porous member held in full surface contact and the flexible porous member spreading forming forces evenly over the glass;
   (d) removing the glass part, first flexible porous member and form from the hot liquid bath as a unit, the glass part, porous member and form remaining in full surface contact, whereupon the glass part and bath composition clinging to the glass part and flexible porous member begin to cool, the glass and the bath composition thereupon hardening; and,
   (e) removing the first flexible porous member from the glass part after the glass has cooled below its softening temperature, thereby also removing the bath composition clinging to the glass.

2. The method of claim 1, further comprising covering the glass with a second flexible porous member before the drawing step, said second flexible porous member cushioning and protecting the glass during the drawing thereof over the form.

3. The method of claim 2, further comprising shaping at least one additional glass part to a complementary shape by covering the second flexible porous member with at least one additional layer of glass before immersing.

4. The method of claim 1 or 2, wherein the flexible porous members are tight mesh screen having a mesh formed of about 0.002 to 0.007 inch diameter strands of about 50 to 450 strands per inch, whereby movement of said bath composition through said flexible porous members is impeded.

5. The method of claim 4, wherein said mesh is woven from stainless steel wire.

6. The method of claim 4, wherein said mesh is knitted.

7. The method of claim 4, wherein said mesh is woven from flexible high temperature ceramic strands.

8. The method of claim 1, wherein the bath is a molten salt, the method further comprising chemical tempering by exchange of smaller cations at the glass surfaces with larger cations in the bath.

* * * * *